United States Patent [19]
Tanahashi

[11] Patent Number: 5,698,823
[45] Date of Patent: Dec. 16, 1997

[54] ELEVATOR CONTROL SYSTEM

[75] Inventor: Toru Tanahashi, Inazawa, Japan

[73] Assignee: Mitsubishi Denki Kabushiki Kaisha, Tokyo, Japan

[21] Appl. No.: 576,132

[22] Filed: Dec. 21, 1995

[30] Foreign Application Priority Data

Jun. 22, 1995 [JP] Japan .................. 7-156181

[51] Int. Cl.⁶ ................. B66B 1/28; H02P 1/00
[52] U.S. Cl. ............. 187/296; 318/721; 187/290
[58] Field of Search ............ 187/296, 290, 187/288; 318/715, 718, 721, 722, 802, 805

[56] References Cited

U.S. PATENT DOCUMENTS

| | | | |
|---|---|---|---|
| 4,649,331 | 3/1987 | Jahns | 318/798 |
| 5,021,724 | 6/1991 | Hirano et al. | 318/800 |
| 5,241,255 | 8/1993 | Oshima et al. | 318/801 |
| 5,285,029 | 2/1994 | Araki | 187/114 |

FOREIGN PATENT DOCUMENTS

| | | |
|---|---|---|
| 59-76191 | 5/1984 | Japan . |
| 1129796 | 5/1989 | Japan . |
| 401133583 | 5/1989 | Japan . |
| 404008185 | 1/1992 | Japan . |

OTHER PUBLICATIONS

Mitsubishi Electric Corporation Technical Paper vol. 67, No. 10, pp. 28–32, 1993. (English Abstract attached).

*Primary Examiner*—Robert Nappi
*Attorney, Agent, or Firm*—Leydig, Voit, & Mayer, Ltd.

[57] ABSTRACT

An elevator control system employs dynamic braking and achieves reduced energy consumption as compared to known elevator control systems. A synchronous motor using a permanent magnet is used as a hoist machine. A contactor short circuits the input terminals of the synchronous motor via a resistor. If an emergency stop is triggered while an elevator car is opened for passengers to enter or exit, the contactor short circuits the input terminals of the synchronous motor.

8 Claims, 11 Drawing Sheets

ELEVATOR CONTROL SYSTEM

BACKGROUND OF THE INVENTION

1. Field of the Invention

The present invention relates to improvements in an elevator control system.

2. Description of the Related Art

FIG. 9 shows the construction of a known elevator control system disclosed in Mitsubishi Electric Corporation Technical Paper Vol. 67, No. 10, pp. 28–32, 1993. Shown in FIG. 9 are a three-phase alternating current power supply 1, a line filter 2, a pulse-width-modulation (PWM) controlled converter 4, a reactor 3 for current limiting the PWM controlled converter 4, a smoothing capacitor 5, a PWM controlled inverter 6, a reactor 7 connected to the output of the PWM controlled inverter 6, an induction motor 8 powered by the PWM controlled inverter 6, and a sheave 9 connected to the induction motor 8 for raising or lowering an elevator car 11 and a counterweight 12 by means of hoist ropes 10.

Also shown in FIG. 9 are a transformer 13 for stepping down the voltage of the three-phase alternating current power supply 1, a phase pickup circuit 14 for picking up one the three phases of the three-phase alternating current power supply 1, a converter control circuit 17 for generating a PWM signal that controls the PWM controlled converter 4 in response to the outputs from a current transformer 15 and a voltage transformer 16, and a gate drive circuit 18 that amplifies the PWM signal from the converter control circuit 17.

The elevator control system further comprises a current transformer 19, a pulse generator 20 directly connected to the induction motor 8 for sensing the speed of the motor 8, an inverter control circuit 21 for generating a PWM control signal that controls the PWM controlled inverter 6 in response to the outputs of the current transformer 19 and the pulse generator 20 and the speed command issued by a controller 22, and a gate drive circuit 23 for amplifying the PWM control signal from the inverter control circuit 21.

The operation of the prior art elevator control system is now discussed. The voltage of the three-phase alternating current power supply 1 is stepped down by the transformer 13. One of the three phases of the stepped down voltage is picked up by the phase pickup circuit 14. Using the outputs of the current transformer 15 and the voltage transformer 16 as feedback signals, the converter control circuit 17 generates the PWM control signal that controls the PWM controlled converter 4 so that its output voltage is kept constant and its input current remains in phase with the power supply voltage. The PWM control signal is amplified by the gate drive circuit 18 to be a gate control signal for the transistor in the PWM control converter 4. Thus, the PWM control signal drives the gate of the transistor to put the converter 4 into operation.

Using the outputs of the current transformer 19 and the pulse generator 20 as feedback signals, the inverter control circuit 21 generates the PWM control signal that controls the PWM controlled inverter 6 so that the induction motor 8 is speed controlled in response to the speed command issued by the controller 22. The PWM control signal is amplified by the gate drive circuit 23 to be a gate control signal for the transistor in the PWM control inverter 6. Thus, the PWM control signal drives the gate of the transistor to put the inverter 6 into operation.

Since the above prior art elevator control system employs an induction motor as a hoisting motor, dynamic braking is unable to function in the event of an emergency stop. To shorten the travel of the elevator car to its complete stop, a heavy duty electromagnetic brake should be used.

Referring to drawings, other known embodiments devised to solve the above problem are discussed.

FIG. 10 is a block diagram showing the construction of another known elevator control system. Those components equivalent to those described in FIG. 9 are designated with the same reference numerals, and their explanation is not repeated. Shown in FIG. 10 are a synchronous motor 24 employing permanent magnet for driving a sheave 9 and being powered by the output that is PWM controlled by an inverter 6, an angle sensor 25 for sensing the angle of rotation of the synchronous motor 24 and an inverter control circuit 26.

The operation of this system is now discussed. The PWM controlled converter 4 is controlled in the same manner as in the known system in FIG. 9. Using the outputs of a current transformer 19 and a pulse generator 20 and the output of the angle sensor 25, as feedback signals, the inverter control circuit 26 generates the PWM control signal that controls the speed of the synchronous motor 24 in response to the speed command issued by a controller 22. The inverter control circuit 26 outputs the PWM control signal to a gate drive circuit 23. The gate drive circuit 23 amplifies the PWM control signal which is fed to the gate of the control device of the PWM controlled inverter 6. The PWM controlled inverter 6 operates accordingly.

The arithmetic operation of the inverter control circuit 26 is now discussed.

FIG. 11 is a block diagram showing the basic arithmetic operation of the inverter control circuit 26 in FIG. 9. Shown in FIG. 11 are coordinates transformation means 27 for transforming input currents $i_u$, $i_v$, $i_w$ to the synchronous motor 24 that are picked up by the current transformer 19 into a q-axis component current $i_q$ and a d-axis component current $i_d$, a subtracter 28 for calculating the difference between a d-axis current command value $i_d^*$ retrieved from a built-in RAM and the d-axis current $i_d$, an operational unit 29 as d-axis computing means for computing a d-axis voltage command $V_d'$, an impedance operational unit 30 for computing the product of the output of the speed sensor 20 and synchronous reactance, a multiplier as q-axis interference voltage operational unit 31 for computing the product of the output of the impedance operational unit 30 and the q-axis current $i_q$ to obtain an interference voltage $\omega L_s i_q$, and a subtracter 32 for subtracting the interference voltage $\omega L_s i_q$ from the d-axis voltage command $V_d'$ output by the operational unit 29 to obtain the d-axis voltage command $V_d^*$.

The inverter control circuit 26 further comprises a subtracter 33 for computing the difference between the output of the speed sensor 20 and the speed command from the controller 22, an operational unit 34 for performing proportional-integral operation to the output of the subtracter 33 to obtain a q-axis current command value $i_q^*$, a subtracter 35 for computing the difference between the q-axis current command value $i_q^*$ and the q-axis current $i_q$, an operational unit 36 as q-axis computing means for performing proportional-integral operation to the output of the subtracter 35 to obtain the q-axis voltage command $V_q'$, a multiplier 37 as d-axis interference voltage operational unit for computing the product of the output of the impedance operational unit 30 and the d-axis component current $i_d$ to obtain the interference voltage $\omega L_s i_d$ arising from the d-axis component current $i_d$, an adder 38 for obtaining a q-axis voltage command $V_q^*$ by adding the interference voltage $\omega L_d i_d$ to the q-axis voltage command $V_q'$, coordinates inverse transformation means 39 for transforming the d-axis voltage command value $V_d^*$ and q-axis voltage $V_q^*$ back into three-phase voltage command values $V_u^*$, $V_v^*$, $V_w^*$, and a PWM generator circuit 40 for generating a PWM control signal based on the voltage command values $V_u^*$, $V_v^*$, $V_w^*$.

The operation of the inverter control circuit 26 is now discussed. The computing and control operation of the synchronous motor 24 is performed based on the rotating coordinate system that is in synchronism with the angle of rotation of the rotor. The d-axis is aligned with the magnetic flux of the permanent magnet, and the q-axis is aligned with the direction perpendicular to the flux. The input currents $i_u$, $i_v$, and $i_w$ to the synchronous motor 24 picked up by the current transformer 19 are converted by the coordinates transformation means 27 into the q-axis component current $i_q$ and d-axis component current $i_d$ relative to the angle of rotation of the motor picked up by the angle sensor 25. The subtracter 28 computes the difference between the d-axis current command value $i_d^*$ retrieved from the ROM contained in the inverter control circuit 26 and the d-axis current $i_d$. The operational unit 29 generates the d-axis voltage command $V_d'$. The impedance operational unit 30 computes the product of the output of speed sensor 20 and synchronous reactance. Impedance should be computed as above, because impedance varies with speed. The multiplier 31 computes the product of the q-axis current $i_q$ and the output of the impedance operational unit 30 to obtain the interference voltage $\omega L_q i_q$ due to the q-axis component current $i_q$. The subtracter 32 subtracts the interference voltage $\omega L_q i_q$ from the d-axis voltage command $V_d'$ to generate the d-axis voltage command $Vd^*$. The d-axis voltage command $V_d^*$ compensates for a drop in magnetic flux due to interference.

The subtracter 33 computes the difference between the output of the speed sensor 20 and the speed command 22a generated by the controller 22. The operational unit 34 performs proportional-integral operation to the difference, resulting in the q-axis current command value $i_q^*$. The subtracter 35 computes the difference between the q-axis current command value $i_q^*$ and the q-axis current $i_q$. The operational unit 36 performs proportional-integral operation to the output of the subtracter 35 to obtain the q-axis voltage command $V_q'$. The impedance operational unit 30 computes the product of the output of the speed sensor 20 and synchronous reactance. The multiplier 37 computes the product of the output of the impedance operational unit 30 and the d-axis component current $i_d$ to obtain the interference voltage $\omega L_d i_d$ arising from the d-axis component current $i_d$. The adder 38 results in the q-axis voltage command $V_q^*$ by adding the interference voltage $\omega L_d i_d$ to the q-axis voltage command $V_q'$. The coordinates inverse transformation means 39 transforms the d-axis voltage command value $V_d^*$ and q-axis voltage $V_q^*$ back into three-phase voltage command values $V_u^*$, $V_v^*$, $V_w^*$ relative to the angle of rotation of the synchronous motor 24 picked up by the angle sensor 25. The PWM generator circuit 40 generates the PWM control signal based on the voltage command values $V_u^*$, $V_v^*$, $V_w^*$, and outputs the PWM control signal to the gate drive circuit 23 to control the output voltage of the inverter 6.

In the prior art elevator control system, no dynamic braking works in the event of an emergency stop. To shorten the travel of the elevator car to its complete stop, a heavy duty electromagnetic brake should be used. On the other hand, there is a public need for the reduction of energy consumption by elevators.

When the synchronous motor is used, the process by the inverter control circuit 26 in FIG. 11 not only suffers a variation in flux density of the permanent magnets of the synchronous motor 24 but also ages with time. When flux density drops below its rated value, the torque of the synchronous motor is lowered to a level which is too low to accelerate the elevator. Conversely, flux density is in excess of the rated value, input voltage to the synchronous motor 24 that is rotating at a high speed is raised excessively. The output voltage of the inverter 6 becomes saturated and the rated speed of the synchronous motor 24 is not maintained.

SUMMARY OF THE INVENTION

In view of the above problem, the present invention has been developed. It is an object of the present invention to provide an elevator control system in which a synchronous motor maintains its rated speed and accelerates the elevator in a sufficient margin even when the flux density of permanent magnets of the synchronous motor drops. It is another object of the present invention to provide an elevator control system which uses dynamic braking allowing a compact design to be implemented into the structure of an electromagnetic brake and which achieves a reduced energy consumption compared to the prior art elevator control system.

To achieve the above object, the elevator control system according to the present invention comprises: a current transformer for picking up an input current the inverter feeds to the synchronous motor; speed sensor means directly connected to the synchronous motor for sensing the rotational speed of the synchronous motor; angle sensor means directly connected to the synchronous motor for sensing the angle of rotation of the synchronous motor; a controller for issuing a speed command to the synchronous motor; and an inverter control circuit comprising a current control section which, using the output from the current transformer, the output of the speed sensor means and the output of the angle sensor means, as feedback signals, controls the component current in phase with the flux of the permanent magnet of the synchronous motor so that the input voltage to the synchronous motor is a predetermined value, according to a current command in phase with the flux of the permanent magnet of the synchronous motor and the speed command issued by the controller, said inverter control circuit generating a pulse width modulation signal that is fed to a gate drive circuit that controls the inverter.

In its second aspect, the inverter control circuit comprises: coordinates transformation means for transforming the current picked up by the current transformer into a d-axis current in phase with the flux of the permanent magnet of the synchronous motor and a q-axis current which is perpendicular to the d-axis current, according to the output of the speed sensor means; an impedance operational unit for determining an impedance by computing the product of the output of the speed sensor means and a predetermined synchronous reactance; a q-axis interference voltage operational unit for determining the interference voltage of the q-axis component current by computing the product of a q-axis current given by the coordinates transformation means and the output of the impedance operational unit; a d-axis interference voltage operational unit for determining the interference voltage of the d-axis component current by computing the product of a d-axis current given by the coordinates transformation means and the output of the impedance operational unit; q-axis operational means for computing a q-axis current command value based on the rotational speed of the synchronous motor picked up by the speed sensor means and the speed command from the controller and for computing a q-axis voltage command based on the q-axis current command value and the q-axis current given by the coordinates transformation means; an adder for adding the interference voltage of the d-axis component current given by the d-axis interference voltage operational unit to the q-axis voltage command from the q-axis operational means; d-axis operational means for outputting a d-axis voltage command based on the d-axis current given by the coordinates transformation means and a d-axis component current command value; a subtracter for subtracting the interference voltage of the q-axis component current given by the q-axis interference voltage operational unit from the d-axis voltage command given by the d-axis operational means; coordinates inverse transformation means for transforming the q-axis voltage command value and the d-axis voltage command value, respectively provided by the adder and the subtracter, back into a three-phase voltage command value, according to the output of the speed sensor means; and a pulse width modulation signal generator circuit for generating a pulse width modulation signal according to the output of the coordinates inverse transformation means.

In the third aspect of the present invention, the current control section comprises: determining means for determining whether or not the synchronous motor is rotating at a constant speed, from the output of the speed sensor means; input voltage operational means for computing the input voltage to the synchronous motor based on the output of the speed sensor means; a q-axis voltage difference operational unit for computing the difference between the q-axis voltage command given by the q-axis operational means and the output of the input voltage operational means; memory means which outputs a value corresponding to the difference given by the q-axis voltage difference operational unit and stores the value, when the determining means determines that the synchronous motor rotates at a constant speed, and which outputs a stored value when the determining means determines that the synchronous motor is accelerating or decelerating; output means for outputting the d-axis current command corresponding to the output of the memory, based on the determination that the flux of the permanent magnet is greater than a predetermined value when the difference is negative; and subtracter means for outputting as the d-axis component current command value the difference obtained by subtracting the d-axis current command of the output means from a predetermined d-axis component current command value.

In its fourth aspect, the present invention further comprises a comparator means for determining whether the output of the memory means is positive or negative and for comparing the output of the memory means with a predetermined value when the output of the memory means is positive, and magnetizer means for magnetizing the permanent magnet by flowing the current command value in phase with the flux of the permanent magnet after stop of the elevator car when the output of the memory circuit is smaller than the predetermined value.

In its fifth aspect, the present invention further comprises restart prevention means for causing an elevator car to stop at the nearest floor and for preventing the restart of the elevator car when the output of the memory circuit is greater than the predetermined value.

In the sixth aspect of the present invention, the current control section is current setting means which allows the d-axis component current command value to be manually entered.

In its seventh aspect, the present invention further comprises shorting means for shorting the input terminals of the synchronous motor, whereby said controller causes the shorting means to short the input terminals of the synchronous motor when an emergency stop is triggered.

In its eighth aspect, the present invention comprises: power supply fault detector means for detecting a fault in power supply; a battery that feeds power to the controller in the event of an power interruption; and an electromagnetic brake for the sheave, whereby the controller causes the shorting means to short the input terminals of the synchronous motor when the power supply fault detector means detects a fault in power supply, allows the elevator car to run to a rescue floor with the electromagnetic brake released when a start command is issued after a shorting by the shorting means, and stops the elevator car to the rescue floor by activating the electromagnetic brake.

DETAILED DESCRIPTION OF THE PREFERRED EMBODIMENTS

Embodiment 1

Figure 1:
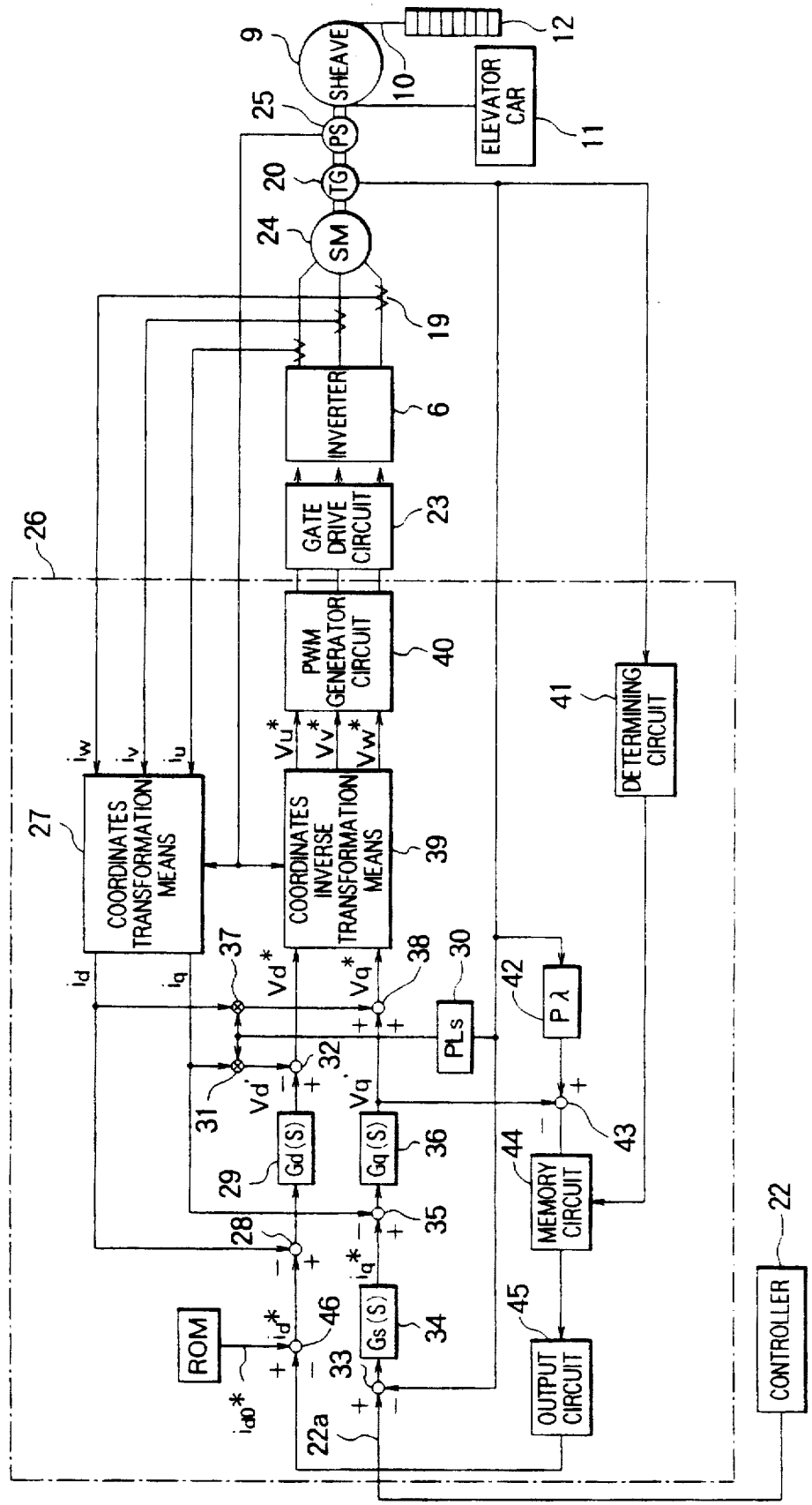
FIG. 1 is a block diagram showing the elevator control system according to embodiment 1 of the present invention.

Embodiment 1 of the present invention is now discussed. FIG. 1 is the block diagram showing the construction of the elevator control system.

Figure 11:
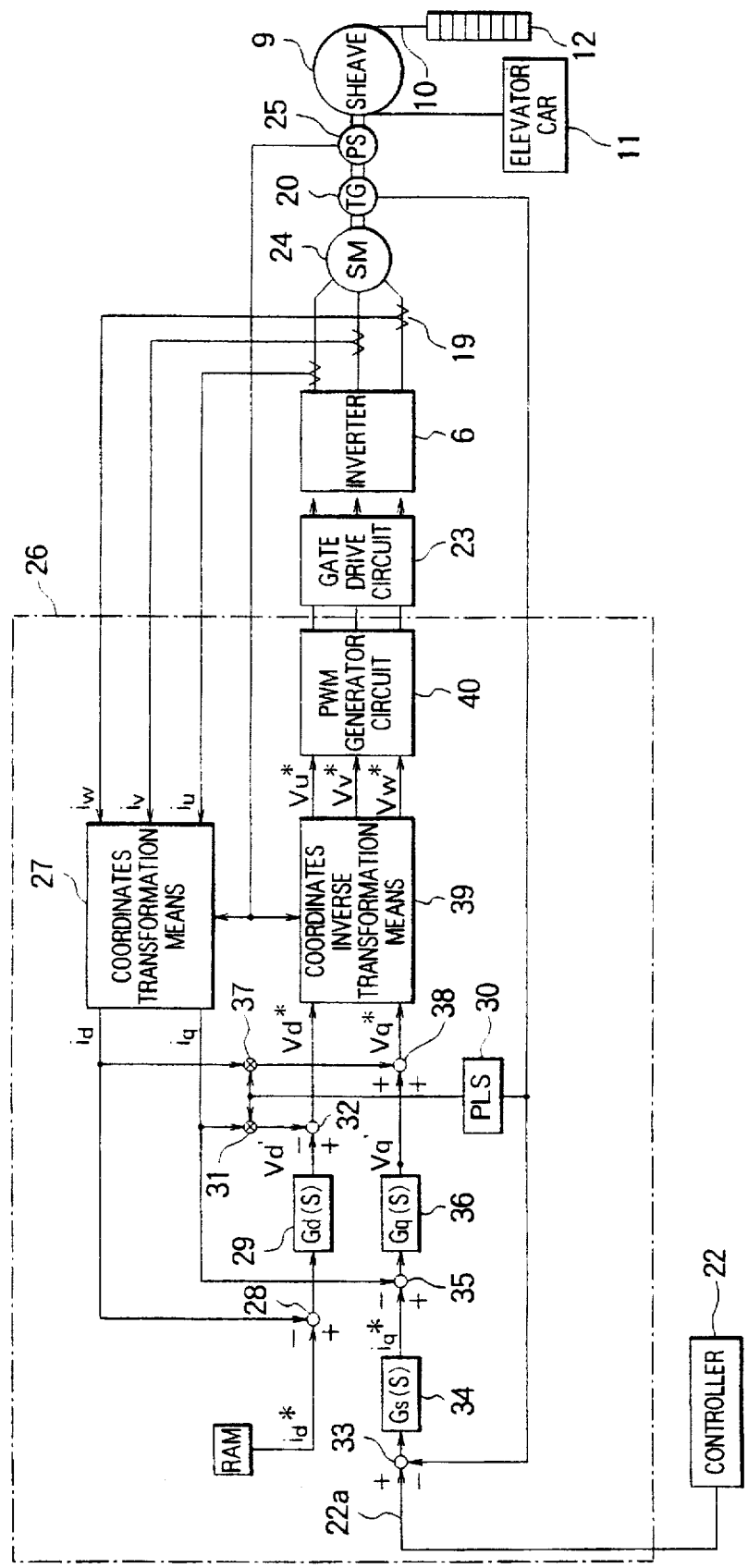
FIG. 11 is a block diagram showing the process of the inverter control circuit of FIG. 10.

Those components equivalent to those described with reference to FIG. 11 are designated with the same reference numerals, and their explanation is not repeated. As shown, the elevator control system comprises further a determining circuit 41 as determining means for determining from the output of the speed sensor 20 whether or not the synchronous motor 24 is rotating at a constant speed, an operational unit 42 as input voltage computing means for computing the input voltage to the synchronous motor 24 in rotation, a subtracter 43 for computing the difference between the q-axis voltage command value $V_q'$ and the output of the operational unit 42, a memory circuit 44 which, according to the output of the determining circuit 41, performs filter operation and proportional operation to the output of the subtracter 43 and outputs the resulting value while the synchronous motor 24 is rotating at the constant speed, and outputs the stored value corresponding to the constant speed of the synchronous motor 24 while the synchronous motor 24 is accelerating or decelerating, an output circuit 45 for outputting a d-axis current command in response to the output of the memory circuit 44, and a subtracter 46 for subtracting the output of the output circuit 45 from a d-axis component current command $i_{do}$* stored in a built-in ROM and for outputting the resulting value to the subtracter 28. The determining circuit 41 through the subtracter 46 constitute a current control section that controls the component current in phase with flux of the permanent magnets of the synchronous motor 24 so that the input voltage to the synchronous motor 24 becomes a predetermined value.

The operation of the elevator control system is now discussed. The determining circuit 41 determines from the output of the speed sensor 20 whether or not the synchronous motor 24 is rotating at a constant speed, and outputs its result to the memory circuit 44. The operational unit 42 computes the input voltage to the synchronous motor 24 in rotation. Let Vm represent the input voltage to the synchronous motor 24.

Vm=(Voltage drop due to resistance in stator winding)+ (Counter electromotive force)

The voltage drop due to the resistance in the stator winding is negligibly small compared to the counter electromotive force. Therefore, $$Vm = p\lambda\omega$$

where p is the number of poles (to be set), λ is the flux density (to be set), and ω is the angular velocity of the motor.

Thus, the input voltage is equal to the counter electromotive force of the synchronous motor 24. The input voltage to the synchronous motor 24 in rotation is an estimated value. The actual input voltage is equivalently determined from the output $V_q'$ of the operational unit 36. When the flux density of the permanent magnets of the synchronous motor 24 is smaller than a predetermined value, $V_q'$ is smaller than Vm ($V_q'$<Vm). Conversely, when the flux density is greater than the predetermined value, $V_q'$ is greater than Vm ($V_q'$>Vm).

The subtracter 43 computes the difference between the voltage command $V_q'$ and the output Vm of the operational unit 42 and outputs the difference to the memory circuit 44. The memory circuit 44 performs filter operation and proportional operation to the difference given by the subtracter 43 when the output of the determining circuit 41 determines that the synchronous motor is rotating at a constant speed, and then outputs the resulting value to the output circuit 45. The output circuit 45 determines that the flux density of the permanent magnets is greater than the predetermined value when the output of the memory circuit 44 is negative, and then the output circuit 45 outputs the d-axis current command. The subtracter 46 subtracts the output of the output circuit 45 from the d-axis current command value $i_{do}$* to output the d-axis component current command value $i_d$* to the subtracter 28.

The d-axis current command value $i_{do}$* is stored in the ROM (not shown) contained in the inverter control circuit 26. The subtracter 28 computes the difference between the d-axis current command value $i_{do}$* and the current command value id. When the synchronous motor 24 accelerates or decelerates, no accurate flux density cannot be determined because the speed varies. The output of the operational unit 42 with the synchronous motor rotating at a constant speed is stored and is then output to the subtracter 46. The flux density of the synchronous motor 24 is controlled to its predetermined value so that the output voltage of the inverter 6 is automatically prevented from being saturated. The synchronous motor is thus rotated at the rated speed.

Embodiment 2

When a sudden change takes place in load torque in the inverter control circuit in FIG. 1, a negative d-axis component current transiently flows occasionally (when $i_d$>$i_d$*). Thus, the d-axis component current command $i_{do}$* should beforehand be set to a predetermined positive value to prevent the permanent magnets from being demagnetized.

Discussed next is the operation of the inverter control circuit when the permanent magnets of the synchronous motor 24 are demagnetized.

Figure 2:
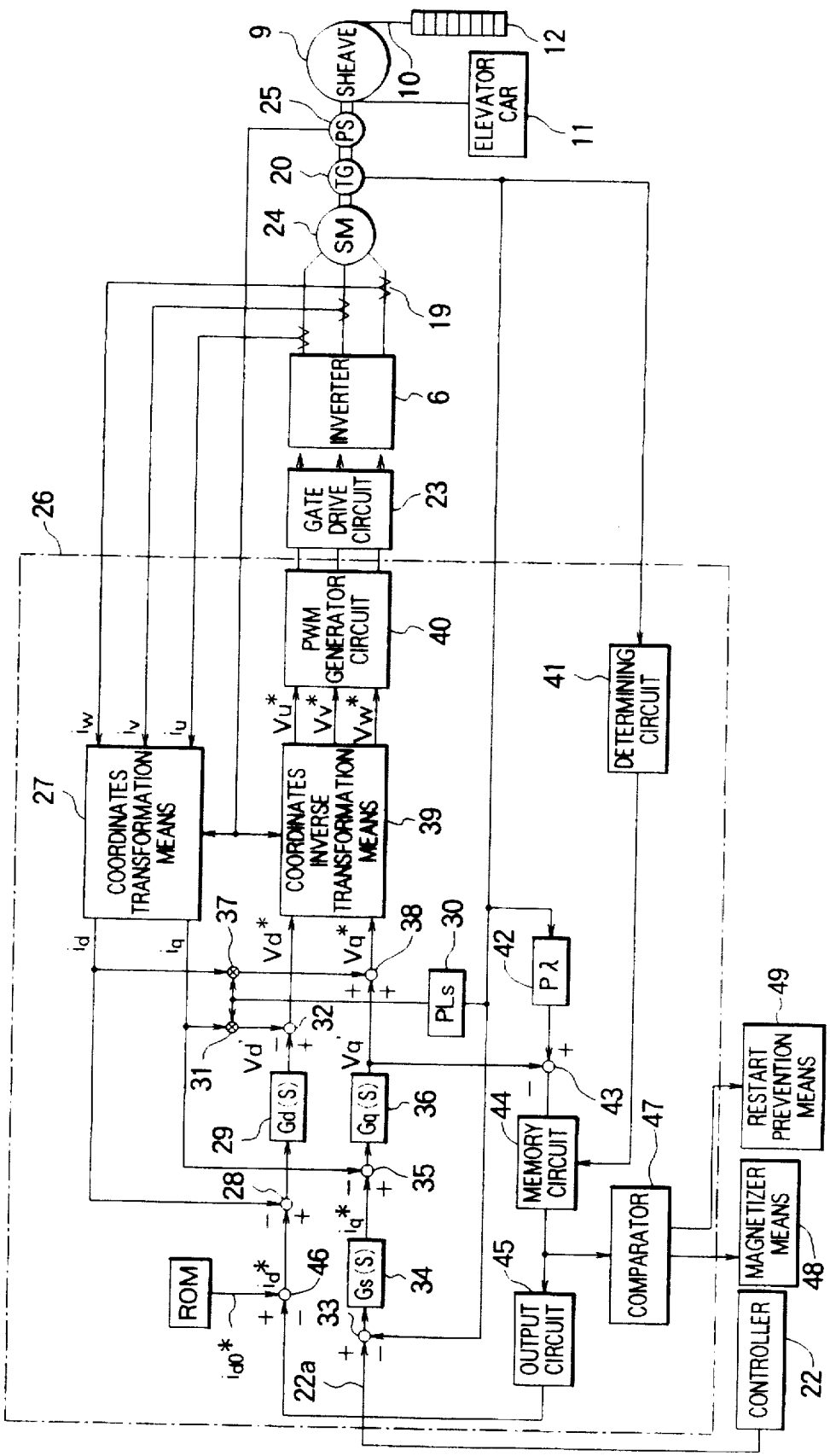
FIG. 2 is a block diagram showing the elevator control system according to embodiment 2 of the present invention.

In addition to those components shown in FIG. 1, the system in FIG. 2 further comprises a comparator 47 for determining whether the output of the memory circuit 44 is positive or negative, namely determining whether or not the permanent magnets are demagnetized, and for comparing the output of the memory circuit 44 with a predetermined value when the output of the memory circuit 44 is positive, magnetizer means 48 for magnetizing the permanent magnets by flowing the current command value in phase with the flux of the permanent magnets after stop of the elevator car when the output of the memory circuit 44 is smaller than the predetermined value according to the output of the comparator 47, and restart prevention means 49 for preventing the restart of the elevator after causing the elevator car to stop at the nearest floor when the output of the memory circuit 44 is greater than the predetermined value. These magnetizer means 48 and restart prevention means 49 may be mounted in the controller 22.

The operation of the elevator control system in FIG. 2 is now discussed. The subtracter 43 in FIG. 2 computes the difference between the voltage command value $V_q'$ and the output Vm of the operational unit 42, and outputs the difference to the memory circuit 44. The memory circuit 44 performs filter operation and proportional operation to the difference given by the subtracter 43 when the synchronous motor rotates at a constant speed as indicated by the output of the determining circuit 41, and outputs the resulting value to the comparator 47.

Figure 3:
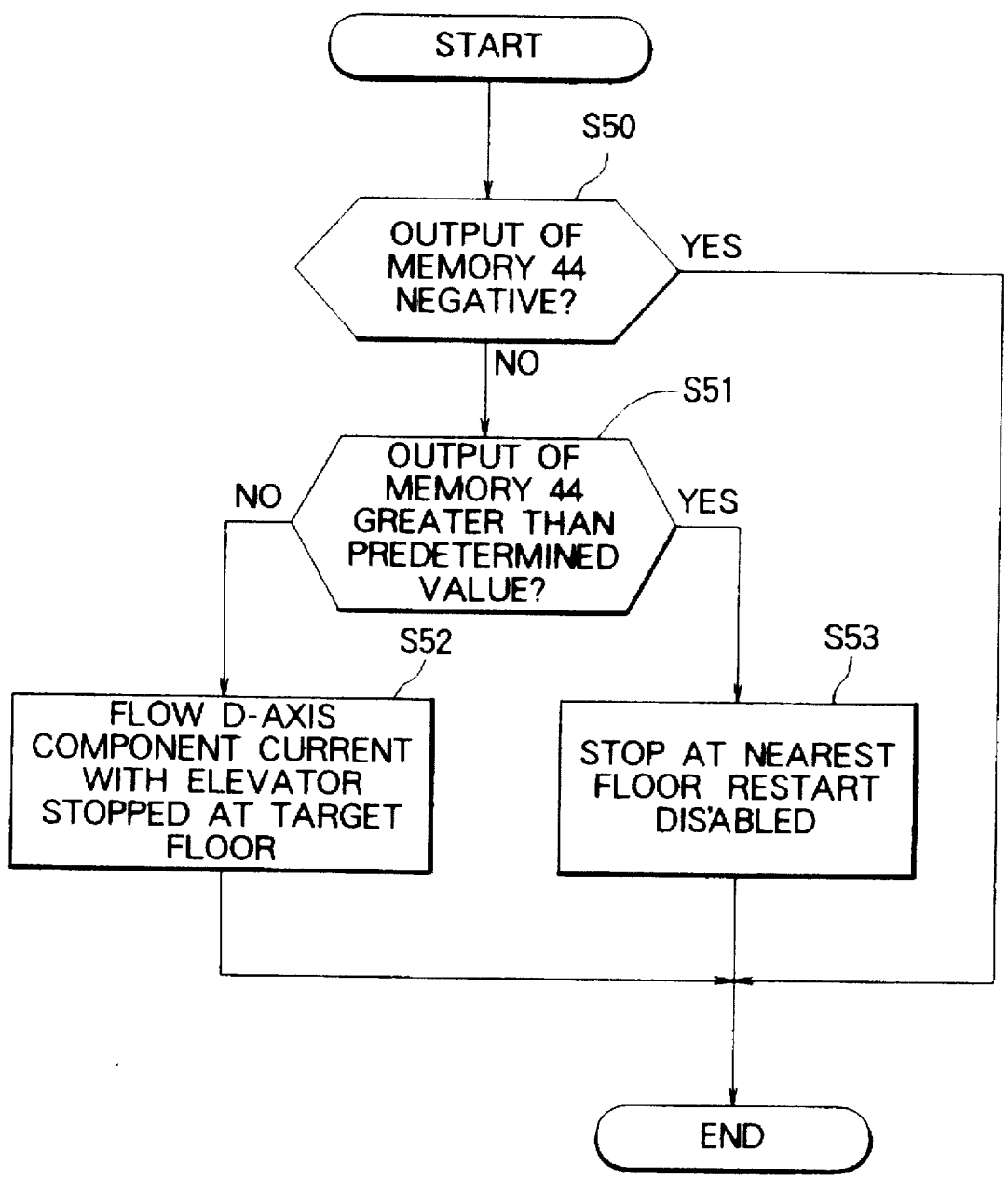
FIG. 3 is a flow diagram showing the elevator control system according to the embodiment 2 of the present invention.

Referring to the flow diagram in FIG. 3, the operation of the system is now discussed.

As shown, at step S50, the comparator 47 determines whether the output of the memory circuit 44 is positive or negative. When it is negative, no demagnetization takes place, and the process ends. A positive output of the memory circuit 44 determines that the permanent magnets are demagnetized. The process goes to step S51, where the output of the memory circuit 44 is compared to the predetermined value. When the output of the memory circuit 44 is smaller than the predetermined value, the process goes to step S52. At step S52, the elevator car is allowed to run to its complete stop at a destination floor and the magnetizer means 48 magnetizes the permanent magnets by allowing the d-axis component current to flow. When the output of the memory circuit 44 is larger than the predetermined value, the process goes to step S53. At step S53, the restart prevention means 49 causes the elevator car to stop to its nearest floor and then the elevator car is put into restart prevention state.

Even if the permanent magnets are demagnetized, they are corrected as above. Furthermore, regardless of demagnetized permanent magnets, the elevator car is safely stopped.

Embodiment 3

Figure 4:
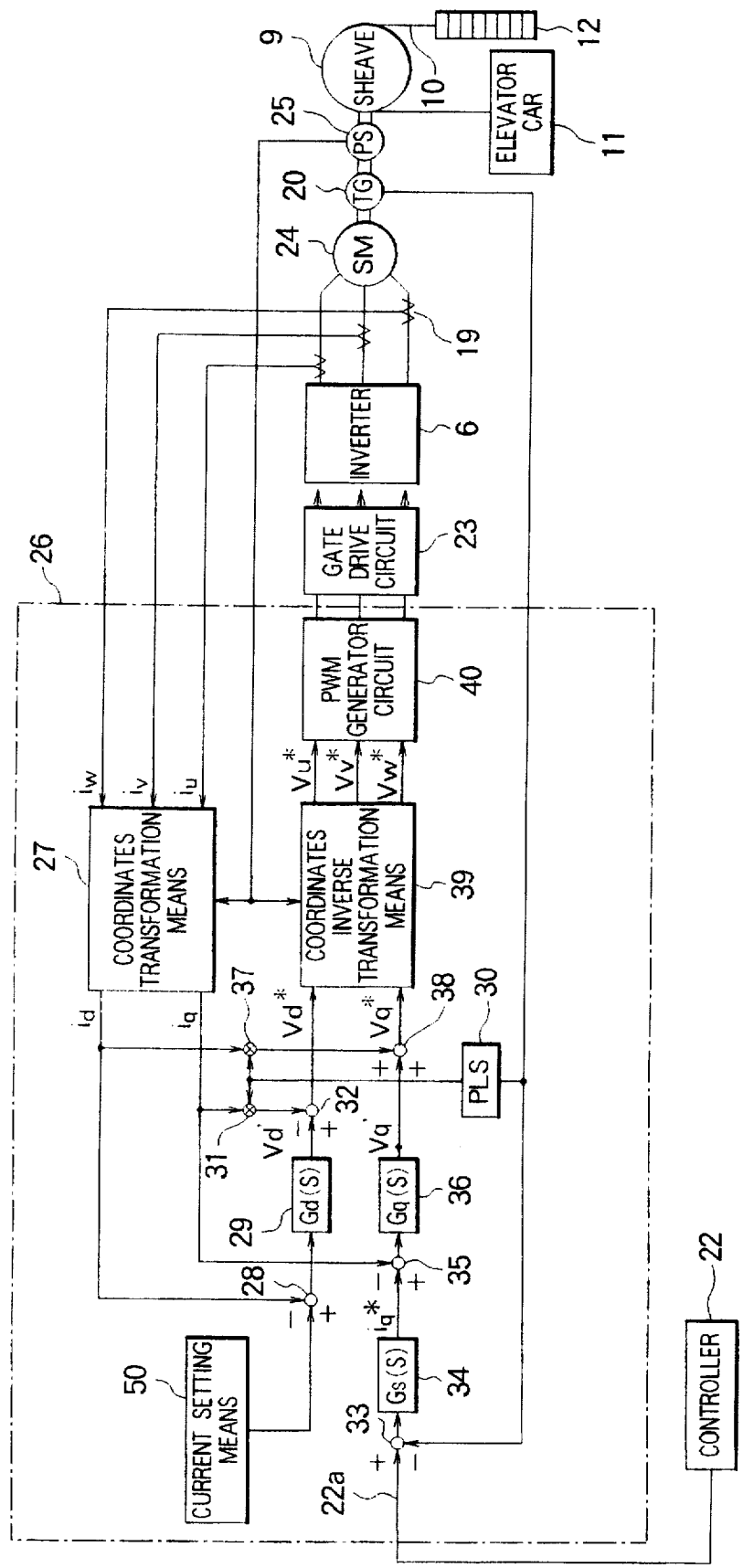
FIG. 4 is a block diagram showing the elevator control system according to embodiment 3 of the present invention.

Embodiment 1 offers the method in which the input voltage to the synchronous motor 24 is automatically corrected by feeding back the sensed counter electromotive force of the synchronous motor 24. As shown in FIG. 4, current setting means 50 as a current control section may be incorporated to manually input a d-axis component current command value. During use, the input voltage to the synchronous motor 24 is measured and then controlled to a predetermined value by allowing a current in phase with the permanent magnets to flow so that the flux in phase with the flux of the permanent magnets of the synchronous motor 24 is increased.

As described above, the permanent magnets are prevented from being demagnetized and the synchronous motor 24 is run at the rated speed.

Embodiment 4

Figure 9:
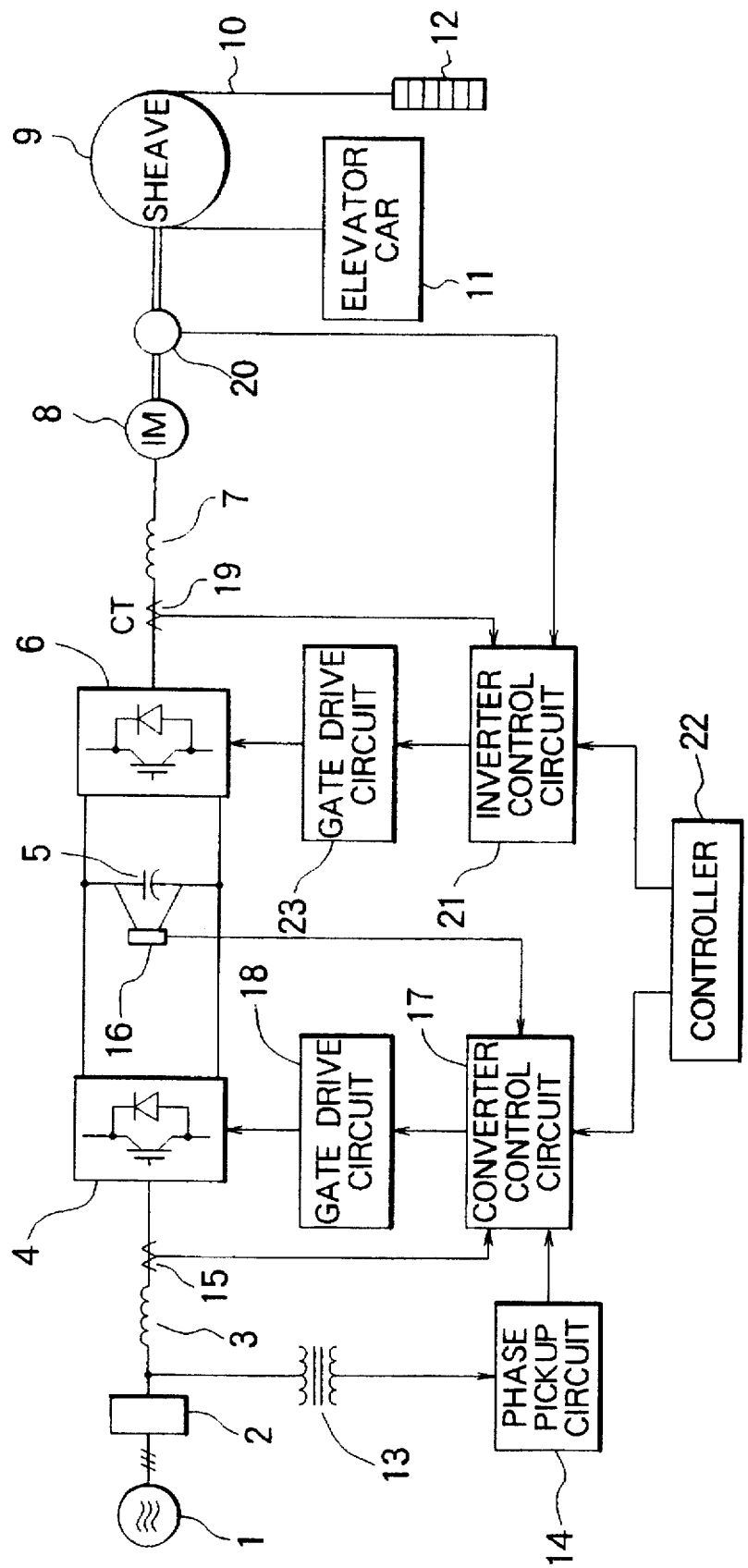
FIG. 9 is a block diagram showing one prior art elevator control system.
Figure 10:
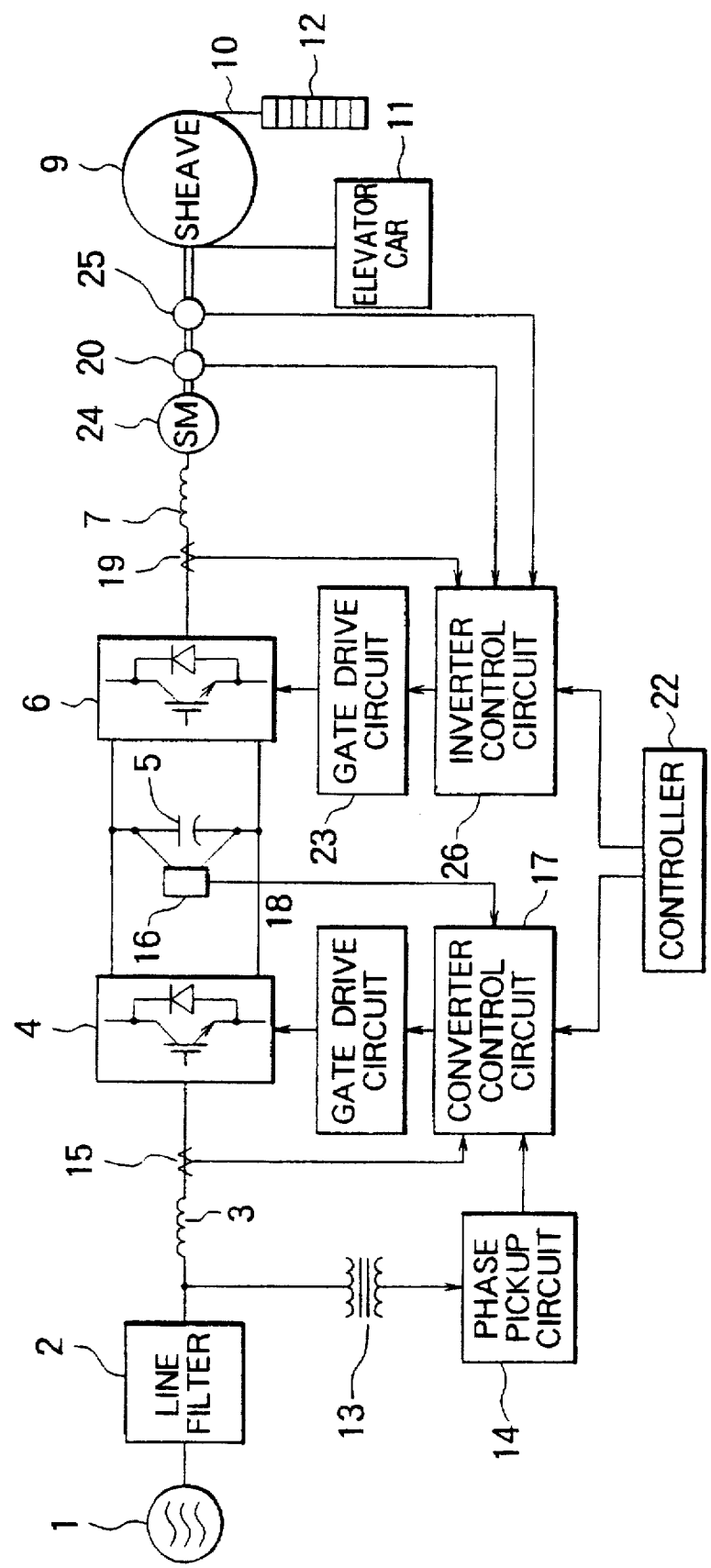
FIG. 10 is a block diagram showing another prior art elevator control system.

In the prior art elevator control system in FIG. 9, an induction motor is used as a hoist machine. No dynamic braking can be operated when the elevator failed during the open state of the elevator door. Thus, an unbalance taking place between the elevator car and the counterweight allows the elevator car to accelerate until the electromagnetic brake is activated. To cause the elevator car to stop as near a floor level as possible, a heavy duty electromagnetic brake is required. When a synchronous motor employing permanent magnets is used as a hoist machine, as already described, the synchronous motor generates the following voltage while it is rotating.

$$Vm = p\lambda\omega$$

When the input terminals of the synchronous motor is shorted via a resistor or directly, the following current flows activating dynamic braking.

$$im = Vm / [(\omega L_s)^2 + R_a^2]^{1/2}$$

where $L_s$ is synchronous reactance, and $R_a$ is the sum of the internal resistance in the winding and an external resistor that shorts the input terminals of the synchronous motor.

Figure 5:
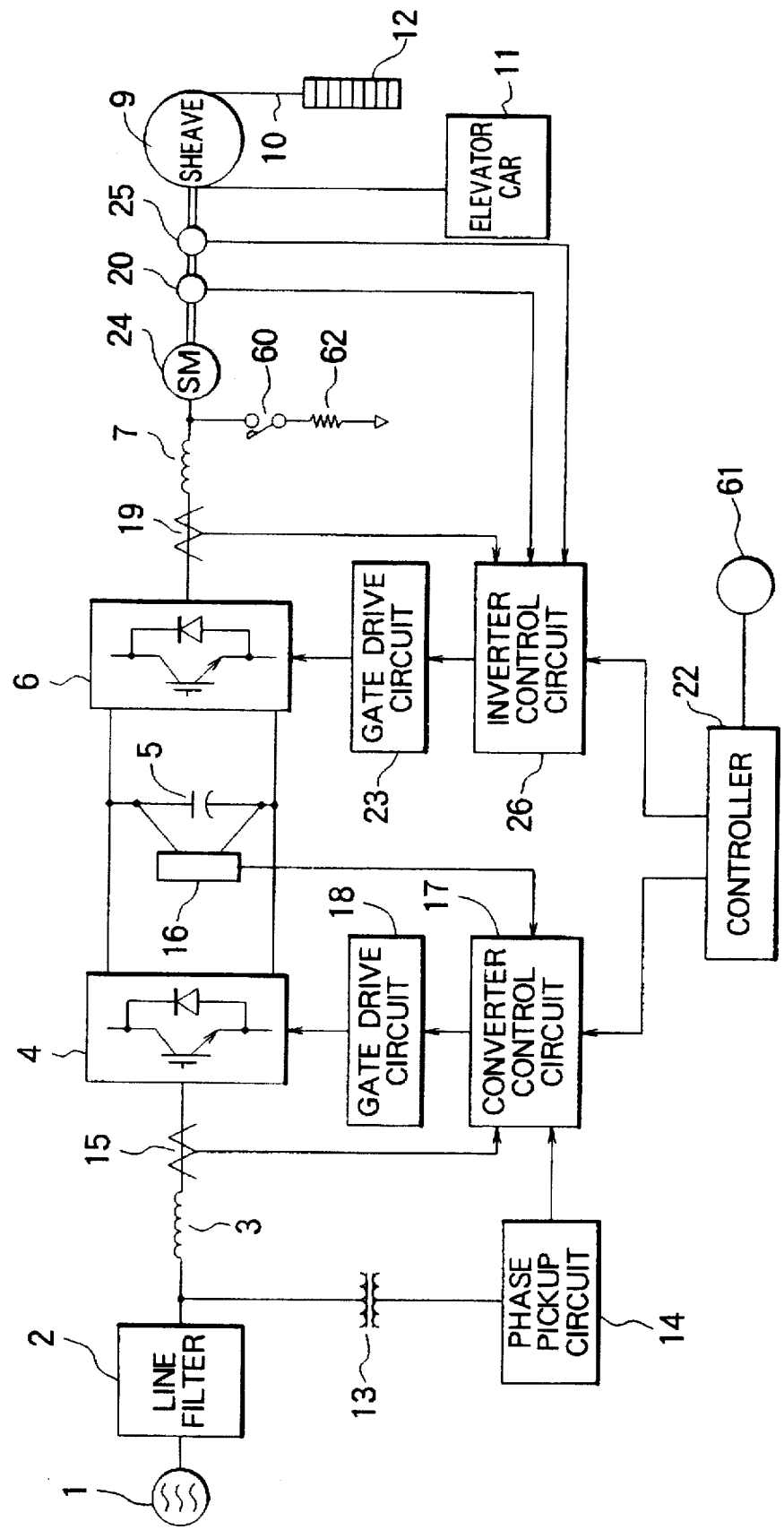
FIG. 5 is a block diagram showing the elevator control system according to embodiment 4 of the present invention.

Embodiment 4 implements the above principle. The elevator control system in FIG. 5 comprises a contactor 60 and a resistor 62, both constituting shorting means that shorts the input terminals of the synchronous motor 24, a contactor coil 61 controlled by the controller 22. Those components equivalent to those described with reference to FIG. 9 are designated with the same reference numerals and their description is not repeated.

Figure 6:
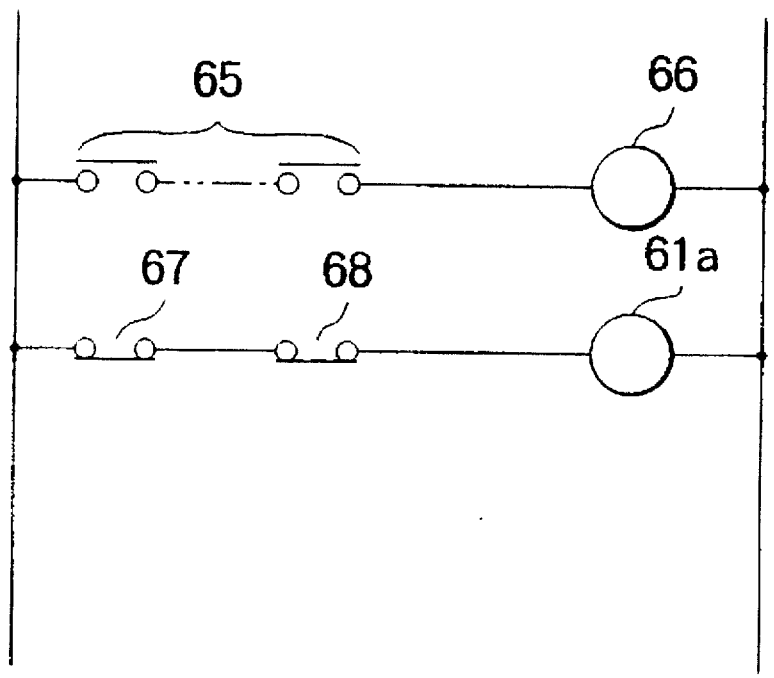
FIG. 6 is a sequence chart showing the process of the controller of FIG. 5.

FIG. 6 shows the sequential process of the controller 22 using an equivalent relay connection. Shown in FIG. 6 are contacts 65 of a switch that senses the open or closed state of the door of the elevator car, a coil 66 that is excited while the elevator door is closed, a breaker contactor 67 which is driven by the coil 66 and which is closed while the elevator door is opened, a contactor 68 which is closed when an emergency stop is triggered by the operation of a safety circuit, and a coil 61a that is excited when an emergency stop is triggered during the open state of the elevator door.

The operation of the controller 22 is now discussed. The safety circuit is activated when the elevator door remains opened for passengers to get in and out. When an emergency stop is triggered, the contactor 68 is closed exciting the coil 61a. The controller 22 excites the contactor coil 61, causing the contactor 60 to be closed. The input terminals of the synchronous motor 24 are shorted via the resistor 62, and dynamic braking is effectively activated.

Thus, the elevator car is prevented from the acceleration, which would otherwise take place due to the unbalance tween the elevator car and the counterweight until the electromagnetic brake (not shown) is really activated. This allows an electromagnetic brake having a small torque to be acceptable. In FIG. 4, the input terminals of the synchronous motor 24 are shorted by the contactor and the resistor 62 in a series connection to restrict current so that the torque of dynamic braking is controlled. When a dynamic braking is too small, a direct shorting without resistor is acceptable.

Embodiment 5

Figure 7:
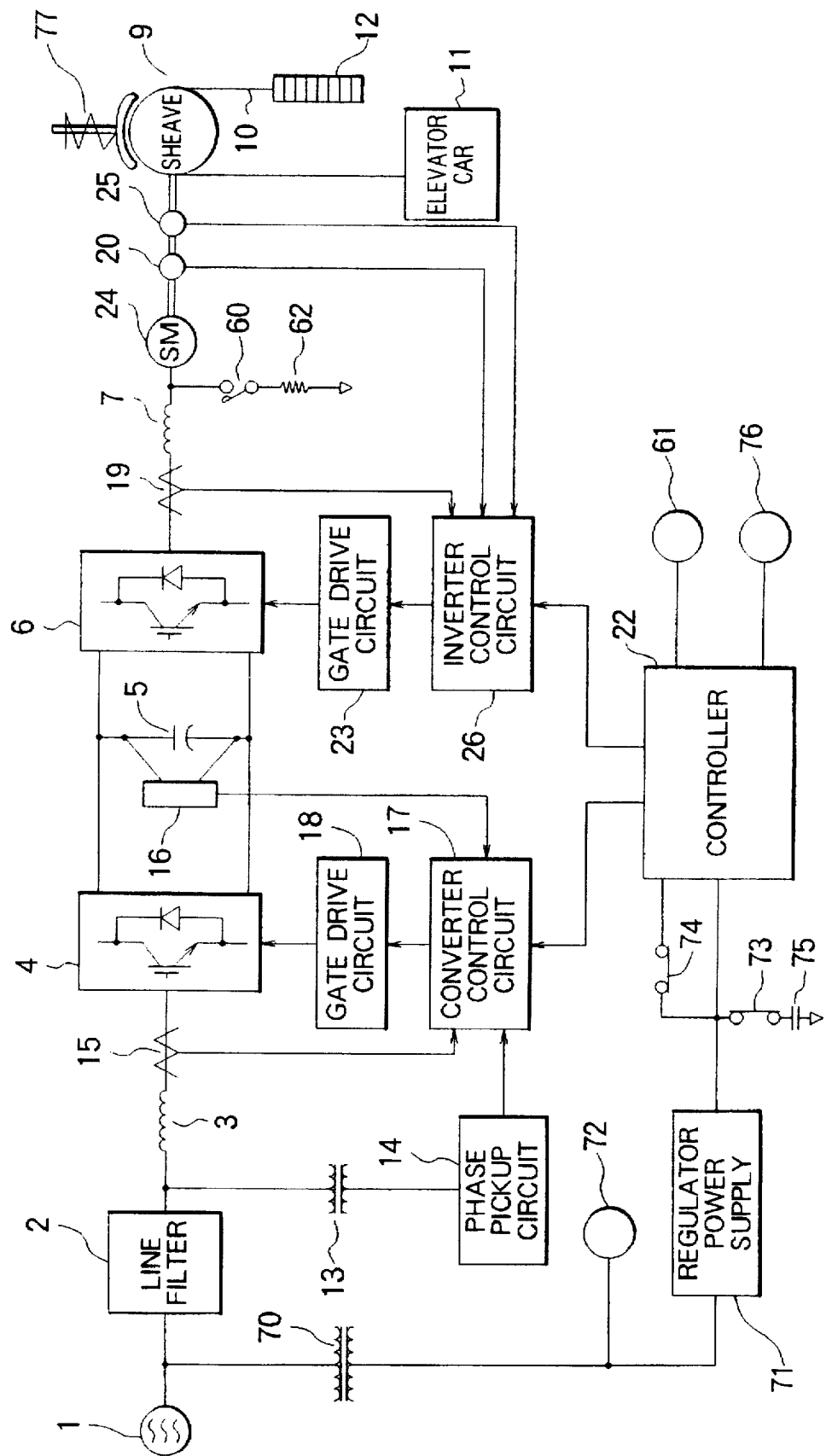
FIG. 7 is a block diagram showing the elevator control system according to embodiment 5 of the present invention.

Referring to FIG. 7, embodiment 5 is now discussed. The elevator control system in FIG. 7 comprises a power transformer 70 for the controller 22, a regulator power supply 71, a relay 72 as power supply fault detector means for detecting a fault in the three-phase alternating current power supply 1, breaker contactors 73, 74 controlled by the relay 72, a battery 75 for supplying current to the controller 22 during power interruption, an electromagnetic brake 77 for the sheave 9, and a coil 76 for the electromagnetic brake. Those components equivalent to those described with reference to FIG. 9 are designated the same reference numerals and their description is not repeated.

Figure 8:
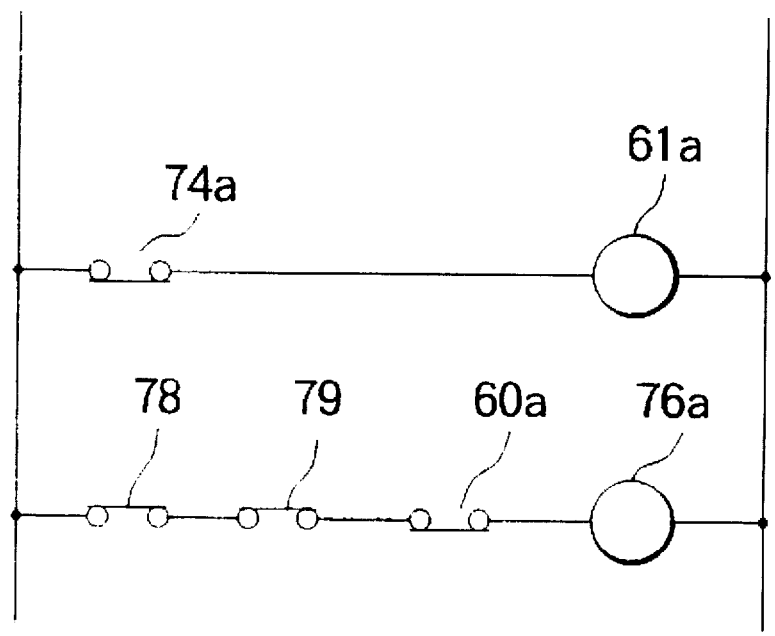
FIG. 8 is a sequence chart showing the process of the controller of FIG. 7.

The operation of the circuit is discussed referring to the sequence diagram in FIG. 8. FIG. 8 shows the sequential process of the controller 22 using an equivalent relay connection. When no voltage appears at the three-phase alternating current power supply 1, the power transformer 70 gives no voltage at its secondary winding, either. The power supply fault detector relay 72 is deactivated, causing the contactor 73 to be closed. The battery 75 starts powering the controller 22. Since the contactor 74 is simultaneously closed, the auxiliary contactor 74a in FIG. 8 is also closed. The coil 61a is excited, and the controller 22 excites the coil 61. Excitation of the coil 61 closes the contactor 60, causing the input terminals of the synchronous motor 24 to be shorted via the resistor 62. When the contactor 60 is closed, its auxiliary contactor 60a is also closed.

When a start command is issued, the contactor 78 is closed and the contactor 79 for detecting an emergency stop floor where the elevator in trouble is serviced is also closed. A coil 76a is excited, causing the electromagnetic brake 77 to be released. The unbalance between the elevator car and the counterweight causes the elevator car to accelerate and the synchronous motor 24 starts rotating. When the synchronous motor 24 starts rotating, an electromotive force takes place and a current flows. The elevator car runs at a speed where the torque generated by the synchronous motor is balanced with the torque due to the unbalance between the elevator car and the counterweight. When the elevator reaches the emergency stop floor, the contactor 79 is opened. The coil 76a is deactivated and the electromagnetic brake functions causing the elevator car to stop.

The above arrangement thus shorts the input terminals of the synchronous motor via the contactor in the event of a power interruption, and allows the elevator car to run to the emergency stop floor at a slow speed with the electromagnetic brake released to rescue passengers out of the elevator car at the floor.

According to the present invention, the elevator control system in which, as its electric motor to drive a sheave, a synchronous motor employing a permanent magnet for magnetic field is used and a pulse-width modulation controlled output provided by an inverter is fed to the synchronous motor, said elevator control system comprising: a current transformer for picking up an input current the inverter feeds to the synchronous motor; speed sensor means directly connected to the synchronous motor for sensing the rotational speed of the synchronous motor; angle sensor means directly connected to the synchronous motor for sensing the angle of rotation of the synchronous motor; a controller for issuing a speed command to the synchronous motor; and an inverter control circuit comprising a current control section which, using the output from the current transformer, the output of the speed sensor means and the output of the angle sensor means, as feedback signals, controls the component current in phase with the flux of the permanent magnet of the synchronous motor so that the input voltage to the synchronous motor is a predetermined value, according to a current command in phase with the flux of the permanent magnet of the synchronous motor and the speed command issued by the controller, said inverter control circuit generating a pulse width modulation signal that is fed to a gate drive circuit that controls the inverter. Thus, the input voltage to the synchronous motor is controlled to the predetermined value. Even though the flux density of the permanent magnet is demagnetized, the elevator is accelerated sufficiently to provide the rated speed output.

Furthermore, the inverter control circuit comprises: coordinates transformation means for transforming the current picked up by the current transformer into a d-axis current in phase with the flux of the permanent magnet of the synchronous motor and a q-axis current which is perpendicular to the d-axis current, according to the output of the speed sensor means; an impedance operational unit for determining an impedance by computing the product of the output of the speed sensor means and a predetermined synchronous reactance; a q-axis interference voltage operational unit for determining the interference voltage of the q-axis component current by computing the product of a q-axis current given by the coordinates transformation means and the output of the impedance operational unit; a d-axis interference voltage operational unit for determining the interference voltage of the d-axis component current by computing the product of a d-axis current given by the coordinates transformation means and the output of the impedance operational unit; q-axis operational means for computing a q-axis current command value based on the rotational speed of the synchronous motor picked up by the speed sensor means and the speed command from the controller and for computing a q-axis voltage command based on the q-axis current command value and the q-axis current given by the coordinates transformation means; an adder for adding the interference voltage of the d-axis component current given by the d-axis interference voltage operational unit to the q-axis voltage command from the q-axis operational means; d-axis operational means for outputting a d-axis voltage command based on the d-axis current given by the coordinates transformation means and a d-axis component current command value; a subtracter for subtracting the interference voltage of the q-axis component current given by the q-axis interference voltage operational unit from the d-axis voltage command given by the d-axis operational means; coordinates inverse transformation means for transforming the q-axis voltage command value and the d-axis voltage command value, respectively provided by the adder and the subtracter, back into a three-phase voltage command value, according to the output of the speed sensor means; and a pulse width modulation signal generator circuit for generating a pulse width modulation signal according to the output of the coordinates inverse transformation means. Thus, the synchronous motor is automatically rotated at the rated speed.

The current control section comprises: determining means for determining whether or not the synchronous motor is rotating at a constant speed, from the output of the speed sensor means; input voltage operational means for computing the input voltage to the synchronous motor based on the output of the speed sensor means; a q-axis voltage difference operational unit for computing the difference between the q-axis voltage command given by the q-axis operational means and the output of the input voltage operational means; memory means which outputs a value corresponding to the difference given by the q-axis voltage difference operational unit and stores the value, when the determining means determines that the synchronous motor rotates at a constant speed, and which outputs a stored value when the determining means determines that the synchronous motor is accelerating or decelerating; output means for outputting the d-axis current command corresponding to the output of the memory, based on the determination that the flux of the permanent magnet is greater than a predetermined value when the difference is negative; and subtracter means for outputting as the d-axis component current command value the difference obtained by subtracting the d-axis current command of the output means from a predetermined d-axis component current command value. Thus, the input voltage to the synchronous motor is controlled to the predetermined value allowing the synchronous motor to rotate at the rated speed.

The present invention further comprises a comparator means for determining whether the output of the memory means is positive or negative and for comparing the output of the memory means with a predetermined value when the output of the memory means is positive, and magnetizer means for magnetizing the permanent magnet by flowing the current command value in phase with the flux of the permanent magnet after stop of the elevator car when the output of the memory circuit is smaller than the predetermined value. Thus, if a demagnetization takes place, it is corrected by magnetizing the permanent magnet.

The present invention further comprises restart prevention means for causing an elevator car to stop at the nearest floor and for preventing the restart of the elevator car when the output of the memory circuit is greater than the predetermined value. Even though the permanent magnet is demagnetized, the elevator car is stopped safely.

According to the present invention, the current control section is current setting means which allows the d-axis component current command value to be manually entered. Thus, the input voltage to the synchronous motor is controlled to the predetermined value, allowing the synchronous motor to rotate at the rated speed.

The present invention further comprises shorting means for shorting the input terminals of the synchronous motor, whereby said controller causes the shorting means to short the input terminals of the synchronous motor when an emergency stop is triggered. Thus, dynamic braking is operative at an emergency stop. A compact electromagnetic brake may be employed.

The present invention further comprises: power supply fault detector means for detecting a fault in power supply; a battery that feeds power to the controller in the event of an power interruption; and an electromagnetic brake for the sheave, whereby the controller causes the shorting means to short the input terminals of the synchronous motor when the power supply fault detector means detects a fault in power supply, allows the elevator car to run to a rescue floor with the electromagnetic brake released when a start command is issued after a shorting by the shorting means, and stops the elevator car to the rescue floor by activating the electromagnetic brake. Thus, when a fault is detected in the power supply, the input terminals of the synchronous motor are shorted. The elevator car may be run to the rescue floor at a slow speed with the electromagnetic brake released and then the passengers may be rescued there.

What is claimed is:

1. An elevator control system comprising:

a synchronous electric motor for driving a sheave and employing a permanent magnet for creating a magnetic flux;

an inverter including a pulse-width modulation controlled output current feeding the synchronous motor;

a current transformer for sensing, and generating an output indicating, the output current that the inverter feeds to the synchronous motor;

speed sensor means directly connected to the synchronous motor for sensing, and generating an output indicating, rotational speed of the synchronous motor;

angle sensor means directly connected to the synchronous motor for sensing, and generating an output indicting, the angle of rotation of the synchronous motor;

a controller for issuing a speed command to the synchronous motor; and an inverter control circuit comprising a current control section including:
 determining means for determining whether the synchronous motor is rotating at a constant speed based on the output of the speed sensor means;
 input voltage means for computing an input voltage to the synchronous motor based on the output of the speed sensor means and generating an output indicating the input voltage;
 q-axis voltage difference means for computing a difference between a q-axis voltage command and the output of the input voltage means and generating an output indicating the difference;
 memory means for outputting a value corresponding to the output of the q-axis voltage difference means, storing the value when the output of the determining means indicates that the synchronous motor is rotating at a constant speed, and outputting a stored value when the output of the determining means indicates that the synchronous motor is not rotating at a constant speed;
 output means for outputting a d-axis current command corresponding to the output of the memory means, based on a determination that the flux of the permanent magnet is greater than a threshold flux when the difference is negative; and
 subtracter means for outputting a d-axis component current command value comprising a difference obtained by subtracting the d-axis current command from a fixed d-axis component current command value, the current control section using the output of the current transformer, the output of the speed sensor means, and the output of the angle sensor means, as feedback signals, and controlling the input current to be in phase with the flux of the permanent magnet of the synchronous motor so that the input voltage to the synchronous motor has a predetermined value, in phase with the flux of the permanent magnet of the synchronous motor, according to a current command and the speed command issued by the controller, the inverter control circuit generating a pulse width modulated signal fed to a gate drive circuit that controls the inverter.

2. The elevator control system according to claim 1, wherein said inverter control circuit comprises:
 coordinates transformation means for transforming the current sensed by the current transformer into a d-axis current in phase with the flux of the permanent magnet of the synchronous motor and a q-axis current orthogonal to the d-axis current, in response to the output of the speed sensor means;
 impedance means for determining an impedance by computing a product of the output of the speed sensor means and a fixed synchronous reactance;
 q-axis interference voltage means for determining an interference voltage of a q-axis component current by computing a product of the q-axis current and the output of the impedance means;
 d-axis interference voltage means for determining an interference voltage of a d-axis component current by computing a product of the d-axis current and the output of the impedance means;
 q-axis operational means for computing a q-axis current command value based on the rotational speed of the synchronous motor sensed by the speed sensor means and the speed command issued by the controller and for computing the q-axis voltage command based on a q-axis current command value and the q-axis current;
 an adder for adding the interference voltage of the d-axis component current to the q-axis voltage command;
 d-axis operational means for outputting a d-axis voltage command based on the d-axis current and a d-axis component current command value;
 a subtracter for subtracting the interference voltage of the q-axis component current from the d-axis voltage command;
 coordinates inverse transformation means for transforming the q-axis voltage command value and the d-axis voltage command value into a three-phase voltage command value in response to the output of the speed sensor and generating an output indicating the three-phase voltage command value; and
 a pulse width modulation signal generator circuit for generating a pulse width modulation signal in response to the output of the coordinates inverse transformation means.

3. The elevator control system according to claim 2 further comprising comparator means for determining whether the output of the memory means is positive or negative, for comparing the output of the memory means with a fixed value when the output of the memory means is positive, and magnetizer means for magnetizing the permanent magnet by supplying a current corresponding to the current command value, in phase with the flux of the permanent magnet, after stopping of an elevator car, when the output of the memory circuit is smaller than the fixed value.

4. The elevator control system according to claim 3 further comprising restart prevention means for causing the elevator car to stop at a nearest floor and for preventing restarting of the elevator car when the output of the memory circuit is greater than the fixed value.

5. The elevator control system according to claim 2, wherein the current control section comprises a current setting means for manually setting the d-axis component current command value.

6. The elevator control system according to claim 1 further comprising shorting means for short circuiting input terminals of the synchronous motor, whereby the controller causes short circuiting of the input terminals of the synchronous motor when an emergency stop is triggered.

7. The elevator control system according to claim 6 further comprising:
   power supply fault detector means for detecting a fault in a power supply;
   a battery for feeding power to the controller during a power interruption; and
   an electromagnetic brake for the sheave, whereby the controller causes the shorting means to short circuit the input terminals of the synchronous motor when the power supply fault detector means detects a fault in the power supply, causes the elevator car to move to a rescue floor with the electromagnetic brake released when a start command is issued after short circuiting by the shorting means, and stops the elevator car at the rescue floor by activating the electromagnetic brake.

8. The elevator control means according to claim 6 comprising:
   an elevator door position sensor producing a first signal when a door of an elevator is open and a second signal when the door is closed;
   a first switch closing in response to the first signal;
   a second switch coupled to the first switch and closing in response to an emergency stop signal; and
   an actuator coupled to the first and second switches actuating the shorting means to short circuit the input terminals of the synchronous motor in response to the closing of both of the first and second switches.

* * * * *